July 30, 1929.　　　　　G. H. ISLEY　　　　　1,722,701

APPARATUS FOR REVERSING AND CONTROLLING REGENERATIVE FURNACES

Filed Jan. 23, 1925　　　2 Sheets-Sheet 1

Inventor
Geo. H. Isley
by Geo. H. Kennedy Jr.
Att'y.

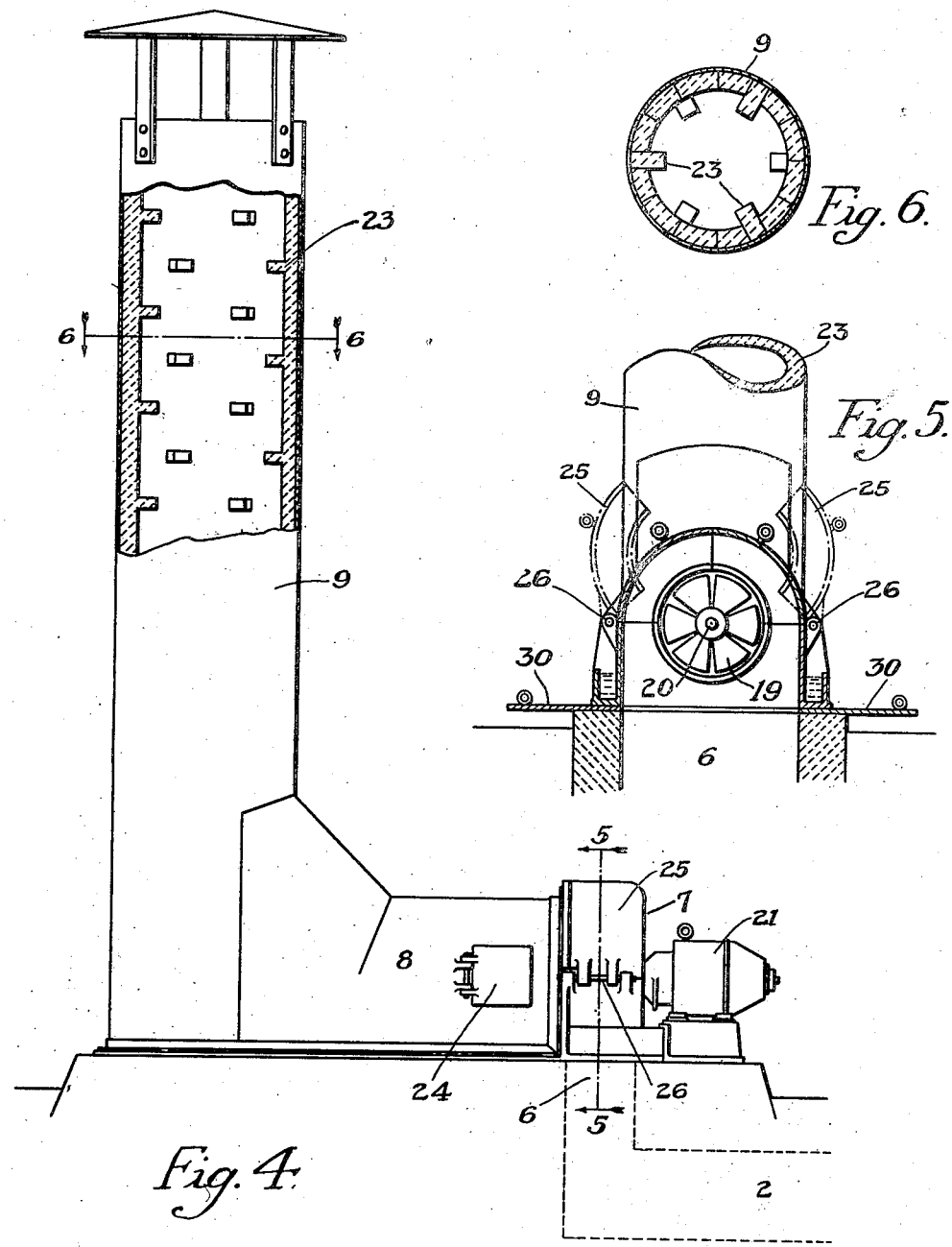

Patented July 30, 1929.

1,722,701

UNITED STATES PATENT OFFICE.

GEORGE H. ISLEY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

APPARATUS FOR REVERSING AND CONTROLLING REGENERATIVE FURNACES.

Application filed January 23, 1925. Serial No. 4,315.

The present invention relates to apparatus for reversing and controlling regenerative furnaces. The apparatus of my present invention utilizes, in part, the principles of operation which characterize the apparatus shown and described in my United States Letters Patent No. 1,464,002, dated August 7, 1923, all as more fully hereinafter described with reference to the accompanying drawings. One object of the present invention is to adapt said principles of operation to large size heating furnaces where the volume of gases required to be handled is greater than can be taken care of by a single blowing device of the type disclosed in the aforesaid Letters Patent. A further object of the invention is to adapt the aforesaid principles of operation to a heating furnace which at times will be operated with producer gas as fuel and at other times with some different fuel, such as oil, powdered coal, or the like.

Other and further features of the invention will be made apparent in the following description, reference being had in this connection to the accompanying drawings, wherein Fig. 1 is a diagrammatic plan view of the invention as applied to a regenerative furnace when the latter is using producer gas as fuel.

Fig. 4 is a side view, partly in section, of one of the blowing ducts employed in the apparatus shown in Figs. 1 and 2.

Fig. 5 is a detail sectional view on the line 5—5 of Fig. 4.

Fig. 6 is a sectional view on the line 6—6 of Fig. 4.

Like reference characters refer to like parts in the different figures.

Figure 1:
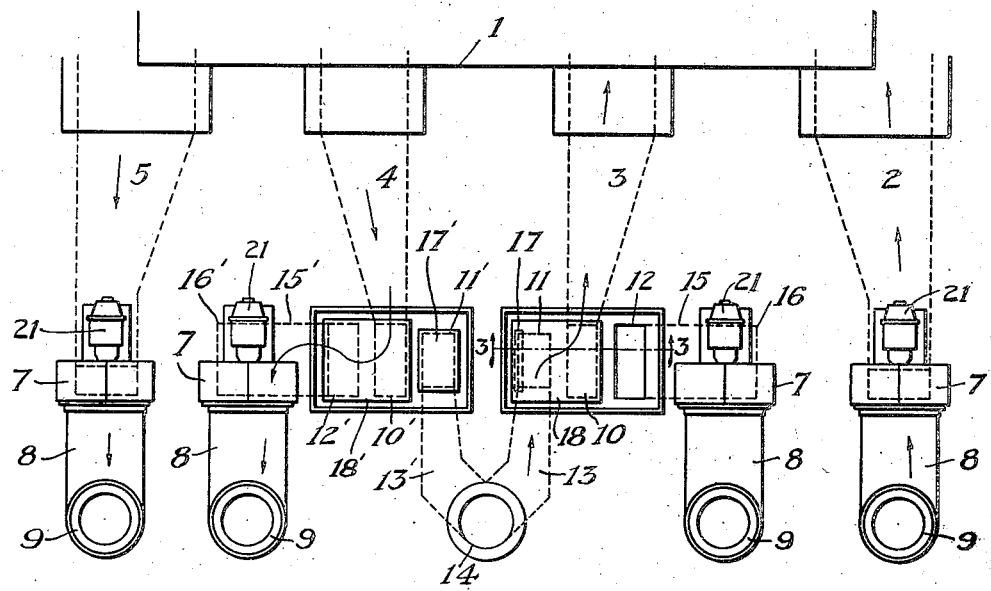
Figure 2:
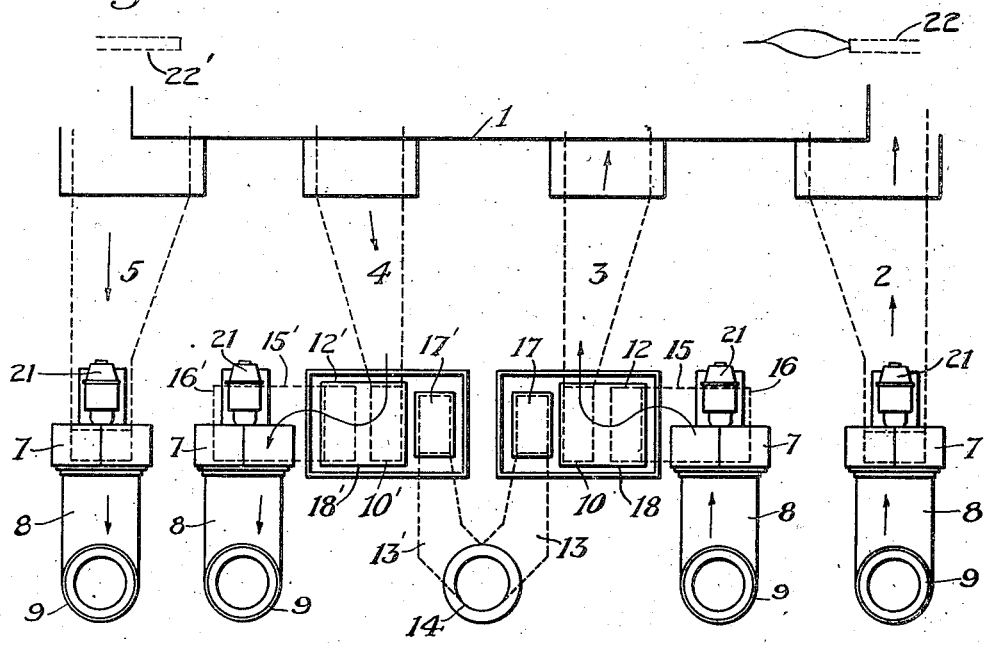
Fig. 2 is a view similar to Fig. 1, illustrating the operation of the invention when the furnace is using fuel other than producer gas.

Referring first to Figs. 1 and 2, the elongated heating chamber 1 of the furnace is in communication near one end with a pair of underground regenerator passages 2, 3, and near the other end with a second pair of underground regenerator passages 4, 5. As shown in Fig. 4, each of the end passages 2 and 5 has a ground level terminal 6 which communicates directly with the interior of a blower casing 7, the latter in turn opening directly into a horizontal branch connection 8 of a vertical open-ended duct 9.

Figure 3:
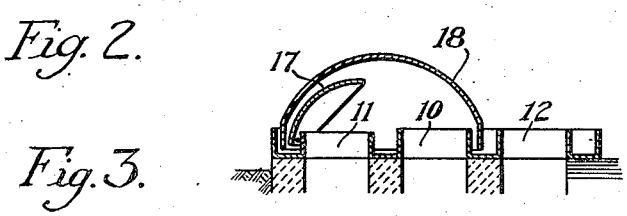
Fig. 3 is a sectional view on the line 3—3 of Fig. 1.

As shown in Figs. 1, 2 and 3, the intermediate regenerator passages 3 and 4 have, respectively, the ground level terminals 10 and 10', the former being disposed between associated ground level terminals 11 and 12, and the latter being disposed between associated ground level terminals 11' and 12'. The terminals 11 and 11' are associated, respectively, with the underground branch connections 13 and 13' of a producer gas supply conduit 14. The terminals 12 and 12' are associated, respectively, with short underground flues 15 and 15', having at their outer ends ground level terminals 16 and 16', respectively, which like the flue terminals 6, 6, (only one herein shown), in each case communicate with blower casings 7, 7, and thence through horizontal branches 8, 8 with individual open-ended ducts 9, 9. Thus, according to the invention, four of these blowers ducts 9, 9 are provided, two in direct association with the two regenerator passages 2 and 5, and two others in indirect association with the two regenerator passages 3 and 4.

The producer gas supply flue terminals 11 and 11' are equipped with pivoted gravity closing covers 17, 17', respectively, of the general form and mode of operation described and claimed in my United States Letters Patent No. 1,408,946, dated March 7, 1922; associated with these covers 17 and 17' are the shiftable hoods 18 and 18' respectively, the one operating in connection with the flue terminals 10, 11 and 12, and the other operating in connection with the flue terminals 10', 11' and 12', in the manner and for the purposes set forth in my aforesaid Letters Patent No. 1,408,946. Within each blower casing 7 is disposed a suitable rotary fan or blower 19, preferably mounted on the shaft 20 of a suitable driving device, here shown as a reversible electric motor 21, disposed outside the blower casing 7. The operation of the apparatus as thus far described is as follows:—

Fig. 1 shows the furnace using producer gas as fuel, and with the apparatus operating to cause the flow of gases through the furnace from right to left. That is to say, the supply of producer gas from main 14 travels through right hand branch 13 and enters beneath hood 18 which, in the position shown, holds the cover 17 of flue terminal 11 open; the other cover 17' of flue terminal 11' is closed by gravity, because the hood 18' is not operatively disposed over terminal 11'. The producer gas thus enters the furnace by way of regenerator passage 3, flowing into said passage through the terminal 10 thereof, which is covered by hood 18. The air for supporting combustion of said gas is drawn in by the blowing device associated with regenerator passage 2, at the extreme right hand end of the furnace, the fan or blower 19 of this device being operated at this time in an ingoing direction, to draw the air down through the associated duct 9 and to force it into the furnace through the regenerator passage 2. Under these conditions, using producer gas as fuel, the next adjacent blowing device, associated with the flue 15, is maintained wholly inoperative. On the left hand side of the furnace, the other two blowing devices are both operated in an outgoing direction, to handle and expel the large volume of waste gases. The device at the extreme left draws said waste gases directly out through the regenerator passage 5 and expels them through its associated duct 9. The next adjacent blowing device, associated with the flue 15', draws waste gases out through the regenerator passage 4, the terminal 10' of which, by means of hood 18', is in communication with the terminal 12' of flue 15'; said waste gases leave by way of the other left hand duct 9.

In order to reverse the furnace, the two hoods 18 and 18' are both shifted to the right, and the motors 21, 21 of the several blowing devices are made to operate as follows:—The motor of the extreme right hand blowing device is reversed, causing its fan 19 to operate in an outgoing direction; the motor of the next adjacent blowing device is started up, also in an outgoing direction; the motor of the extreme left hand blowing device is reversed, to cause its fan to work in an ingoing direction; and the motor of the adjacent blowing device, associated with flue 15', is stopped. Under these conditions, producer gas flows to the furnace by way of branch 13', hood 18' and regenerator passage 4, and air is blown into the furnace by the left hand blowing device through regenerator passage 5. Waste gases leave the furnace partly by way of regenerator passage 2 and partly by way of regenerator passage 3, the latter under these conditions being connected to the flue 15 by hood 18.

Fig. 2 shows the disposition of the above described devices when the furnace, instead of using producer gas as fuel, is operated with oil, or some other fuel that does not require to be passed through regenerator passages. As shown in Fig. 2, under these conditions, the hoods 18 and 18' always occupy an inoperative position relative to the flue terminals 11 and 11', the latter both being entirely closed off by their gravity closing covers 17 and 17', respectively. Assuming the flow of gases through the furnace from right to left, the two right hand blowing devices are both operated in an ingoing direction, to force in air through the two regenerator passages 2 and 3 in sufficient quantity to support combustion of the fuel, such as oil, coke oven gas, or the like, which is supplied, under these conditions, by a suitable burner 22. The waste gases are drawn out through the regenerator passages 4 and 5, by outgoing operation of both of the left hand blowing devices. In order to reverse the furnace, the burner 22 is made inoperative, and another burner 22' at the other end of the furnace is made operative; at the same time, the motors 21, 21 of all four blowing devices are reversed, so that the air supply is forced in through the regenerator passages 4 and 5 and the waste gases are drawn out through the regenerator passages 2 and 3.

As shown in Figs. 4 and 6, each of the four ducts 9, 9 is preferably lined with suitable refractory material, the arrangement of which, as shown at 23, may be in the form of checker work, designed to absorb the heat of the waste gases expelled through said conduit 9 when the associated fan or blower 19 thereof is operating in an outgoing direction. Under such conditions, the blower 19, handling the hot waste gases from the furnace, becomes itself very warm, and in order to protect it from sudden temperature changes when reversal takes place, the cold air which is drawn in through the duct 9 following such reversal is caused, by said checkerwork 23, to absorb considerable heat before it reaches said blower or fan 19. Also, as shown in Fig. 4, each horizontal branch connection 8, connecting the blower casing 7 with its associated duct 9, is preferably equipped with a door 24, to give access to the fan or blower for purposes of cleaning, or for purposes of repairs which do not require complete removal of the blowing unit. If such removal is required, the construction of the blower casing 7 is such as to permit it, the casing being formed in two segments 25, 25 which are hinged at 26, 26, so that they may be swung back, as shown in broken lines in Fig. 5, to allow the fan 19 along with the motor 21 to be lifted entirely out of the casing.

As shown in Fig. 5 each ground level flue terminal 6, 6' 16, 16' is equipped with a pair of sliding dampers 30, 30, disposed in suitable guide channels provided by the bottom of the associated blower casing 7, these dampers being employed, when the blowing devices are inoperative, to close the flues, thereby holding the heat in the furnace.

I claim,

1. The combination with a regenerative heating furnace, of a pair of regenerator passages near each end thereof, a blowing device associated with each regenerator passage, and means for selectively operating each of said devices either in an ingoing or an outgoing direction.

2. The combination with a regenerative heating furnace, of a pair of regenerator passages near each end thereof, a reversible blowing device associated with each regenerator passage, and adapted to be rendered operative or inoperative with respect thereto, and a producer gas supply main adapted to be connected to one of said passages when the blowing device of said passage is inoperative.

3. The combination with a regenerative heating furnace, of a pair of regenerator passages near each end thereof, a blowing device associated with each regenerator passage, a proucer gas supply main, and means selectively operable to connect said supply main to one or the other of two of said passages.

4. The combination with a regenerative heating furnace, of a pair of regenerator passages near each end thereof, a reversible blowing device in each passage, means for operating each blowing device alternately to supply air to and withdraw waste gases from the furnace, and means beyond each blowing device in each passage for regeneratively heating air before it reaches said device.

Dated this 19th day of January, 1925.

GEORGE H. ISLEY.